United States Patent
Lee et al.

(10) Patent No.: US 12,062,286 B2
(45) Date of Patent: Aug. 13, 2024

(54) METHOD, APPARATUS, SERVER, AND COMPUTER PROGRAM FOR COLLISION ACCIDENT PREVENTION

(71) Applicant: SEOUL ROBOTICS CO., LTD., Seoul (KR)

(72) Inventors: Hanbin Lee, Seoul (KR); Jaeil Park, Seoul (KR); Hong Minh Truong, Suwon-si (KR); Oran Kwon, Hanam-si (KR)

(73) Assignee: Seoul Robotics Co., Ltd., Seoul (KR)

( * ) Notice: Subject to any disclaimer, the term of this patent is extended or adjusted under 35 U.S.C. 154(b) by 68 days.

(21) Appl. No.: 17/760,435

(22) PCT Filed: Nov. 13, 2020

(86) PCT No.: PCT/KR2020/015960
§ 371 (c)(1),
(2) Date: Aug. 9, 2022

(87) PCT Pub. No.: WO2021/162205
PCT Pub. Date: Aug. 19, 2021

(65) Prior Publication Data
US 2023/0126901 A1    Apr. 27, 2023

(30) Foreign Application Priority Data
Feb. 10, 2020 (KR) .................. 10-2020-0015666

(51) Int. Cl.
*G08G 1/16* (2006.01)
*G06F 18/241* (2023.01)
(Continued)

(52) U.S. Cl.
CPC .......... *G08G 1/166* (2013.01); *G06F 18/241* (2023.01); *G08G 1/005* (2013.01); *G08G 1/095* (2013.01); *G08G 1/164* (2013.01)

(58) Field of Classification Search
CPC ........ G08G 1/166; G08G 1/005; G08G 1/095; G08G 1/164; G06F 18/241
See application file for complete search history.

(56) References Cited

U.S. PATENT DOCUMENTS

2008/0238723 A1* 10/2008 Fein .................. G01C 21/3697
340/988
2008/0309468 A1    12/2008 Greene et al.
(Continued)

FOREIGN PATENT DOCUMENTS

JP    2008-198162 A    8/2008
JP    2008-217120 A    9/2008
(Continued)

OTHER PUBLICATIONS

Office Action dated Aug. 16, 2023 in Japanese Application No. 2022-548579.
(Continued)

*Primary Examiner* — Sisay Yacob
(74) *Attorney, Agent, or Firm* — Knobbe, Martens, Olson & Bear, LLP

(57) ABSTRACT

A collision accident prevention method, apparatus, server, and computer program are proposed. The method can include predicting, based on data on a three-dimensional (3D) space corresponding to a caution zone, motion of each of at least one pedestrian in the caution zone and at least one vehicle in the caution zone. The method may also include determining, based on the predicted motion, a degree of risk of collision between the at least one pedestrian and the at least one vehicle. The method may further include providing a message corresponding to the determined degree of risk of collision to the at least one vehicle.

15 Claims, 10 Drawing Sheets

(51) Int. Cl.
*G08G 1/005* (2006.01)
*G08G 1/095* (2006.01)

(56) References Cited

U.S. PATENT DOCUMENTS

| | | | |
|---|---|---|---|
| 2018/0105107 A1 | 4/2018 | Hassan-Shafique et al. | |
| 2018/0293893 A1 | 10/2018 | Yang et al. | |
| 2018/0357772 A1 | 12/2018 | Takemura et al. | |
| 2019/0287401 A1 | 9/2019 | Aoude et al. | |
| 2020/0349843 A1 | 11/2020 | Liu et al. | |
| 2021/0197846 A1* | 7/2021 | Thakur | G01S 17/931 |

FOREIGN PATENT DOCUMENTS

| | | | |
|---|---|---|---|
| JP | 2011-100492 A | 5/2011 | |
| JP | 2018-180788 A | 11/2018 | |
| JP | 2019-67282 A | 4/2019 | |
| KR | 10-2011-0057492 A | 6/2011 | |
| KR | 10-2014-0046953 A | 4/2014 | |
| KR | 10-2015-0097031 A | 8/2015 | |
| KR | 10-2016-0087277 A | 7/2016 | |
| KR | 10-2019-0062184 A | 6/2019 | |
| WO | WO 2019/069554 A1 | 4/2019 | |
| WO | WO 2019/165409 A1 | 8/2019 | |

OTHER PUBLICATIONS

Examination Report dated Aug. 4, 2023 in Australian Application No. 2020428822.
International Search Report and Written Opinion mailed Feb. 18, 2021 in International Application No. PCT/KR2020/015960. (English translation of ISR.).
Office Action dated Dec. 23, 2020 in Korean Application No. 10-2020-0015666.
Notice of Allowance dated Jun. 25, 2021 in Korean Application No. 10-2020-0015666.
Extended European Search Report received in European Application No. 20919152.7 dated Feb. 8, 2024.
Office Action received in Japanese Application No. 2022-548579 dated Feb. 20, 2024.

* cited by examiner

METHOD, APPARATUS, SERVER, AND COMPUTER PROGRAM FOR COLLISION ACCIDENT PREVENTION

The present application is a U.S. national phase application under 35 U.S.C. § 371 of International Application No. PCT/KR2020/015960, filed on Nov. 13, 2020, which claims the benefit of Korean Patent Application No. 10-2020-0015666 filed on Feb. 10, 2020 in the Korean Intellectual Property Office, the entire disclosure of each of which is incorporated herein by reference.

TECHNICAL FIELD

The present disclosure relates to a collision accident prevention method, apparatus, server, and computer program.

BACKGROUND ART

Social interest in collision between a pedestrian and a vehicle in a caution zone including a school zone has increased. There have been studies on technologies for detecting a moving object within a specific zone. Although there is a method of detecting an object by using a camera for capturing a high-resolution image, the method may have problems in that an exact location of the object in a three-dimensional space may not be known and privacy infringement may occur due to the high-resolution image captured by the camera.

DESCRIPTION OF EMBODIMENTS

Technical Problem

The present disclosure provides a collision accident prevention method, apparatus, server, and computer program.

Solution to Problem

According to a first aspect, a collision accident prevention method performed by a computing device includes predicting, based on data on a three-dimensional (3D) space corresponding to a caution zone, motion of each of at least one pedestrian in the caution zone and at least one vehicle in the caution zone, determining, based on the predicted motion, a degree of risk of collision between the at least one pedestrian and the at least one vehicle, and providing a message corresponding to the determined degree of risk of collision to the at least one vehicle.

According to a second aspect, a collision accident prevention apparatus includes a sensor unit configured to detect a three-dimensional (3D) space corresponding to a caution zone, a communication interface device, a memory storing instructions, and a processor configured to execute the instructions to predict, based on data on the 3D space detected by the sensor unit, motion of each of at least one pedestrian in the caution zone and at least one vehicle in the caution zone, determine, based on the predicted motion, a degree of risk of collision between the at least one pedestrian and the at least one vehicle, and provide a message corresponding to the determined degree of risk of collision to the at least one vehicle through the communication interface device.

According to a third aspect, a collision accident prevention server includes a communication interface device, a memory storing instructions, and a processor configured to execute the instructions to predict, based on data on a three-dimensional (3D) space corresponding to a caution zone obtained through the communication interface device, motion of each of at least one pedestrian in the caution zone and at least one vehicle in the caution zone, determine, based on the predicted motion, a degree of risk of collision between the at least pedestrian and the at least one vehicle, and provide a message corresponding to the determined degree of risk of collision to the at least one vehicle through the communication interface device.

According to a fourth aspect, a computer program is stored in a medium to execute a method by using a computing device, the method including predicting, based on data on a three-dimensional (3D) space corresponding to a caution zone, motion of each of at least one pedestrian in the caution zone and at least one vehicle in the caution zone, determining, based on the predicted motion, a degree of risk of collision between the at least one pedestrian and the at least one vehicle, and providing a message corresponding to the determined degree of risk of collision to the at least one vehicle.

BEST MODE

According to a first aspect, a collision accident prevention method performed by a computing device includes predicting, based on data on a three-dimensional (3D) space corresponding to a caution zone, motion of each of at least one pedestrian in the caution zone and at least one vehicle in the caution zone, determining, based on the predicted motion, a degree of risk of collision between the at least one pedestrian and the at least one vehicle, and providing a message corresponding to the determined degree of risk of collision to the at least one vehicle.

MODE OF DISCLOSURE

Hereinafter, various embodiments will be described in detail with reference to the drawings. The embodiments described below may be modified and implemented in various forms. In the following description, well-known functions or constructions are not described in detail for clarity of description when it is determined that they are well known to one of ordinary skill in the art.

It will be understood that when an element is referred to as being "connected to" another element, it may be "directly connected" to the other element, or "indirectly connected" to the other element, with intervening elements therebetween. It will be further understood that the terms "comprises," "comprising," "includes," and/or "including" used herein specify the presence of components, but do not preclude the presence or addition of one or more other components, unless otherwise specified.

It will be understood that, although the terms "first", "second", etc. may be used herein to describe various elements, these elements should not be limited by these terms. These terms are only used to distinguish one component from another.

The present embodiments relate to a collision accident prevention method, apparatus, server, and computer program, and well-known functions or constructions are not described in detail when it is determined that they are well known to one of ordinary skill in the art to which the embodiments belong.

Figure 1:
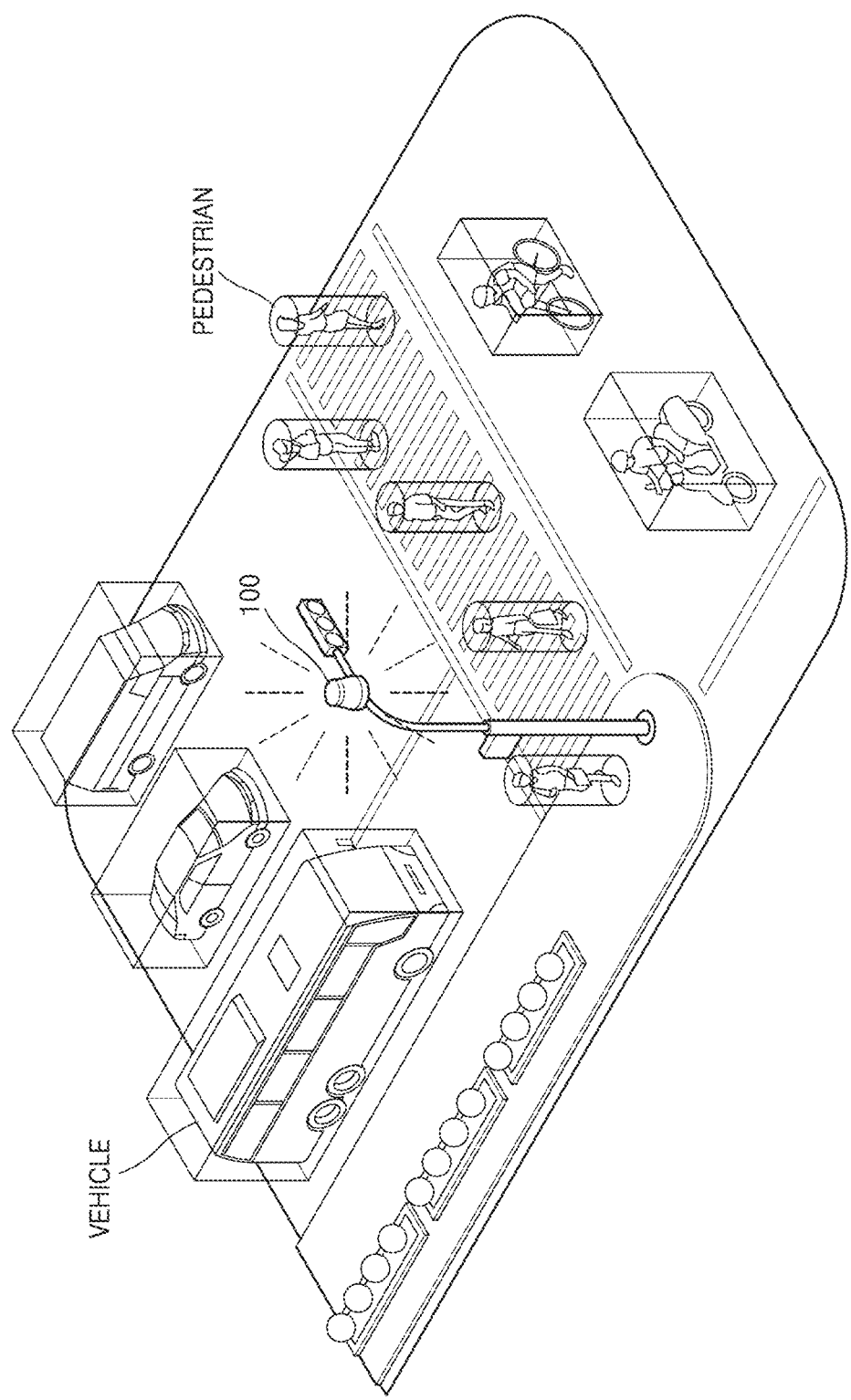
FIG. 1 is a view for describing an environment in an arbitrary caution zone in which a collision accident prevention apparatus is located, according to an embodiment.

FIG. 1 is a view for describing an environment in an arbitrary caution zone in which a collision accident prevention apparatus 100 is located, according to an embodiment.

The collision accident prevention apparatus 100 that may detect a three-dimensional (3D) space corresponding to the caution zone and may obtain data on the 3D space may include at least one sensor for detecting the 3D space. The caution zone may be a certain zone such as a school zone, a pedestrian protection zone, a child protection zone, an elderly protection zone, an accident-prone zone, or a crosswalk zone.

The collision accident prevention apparatus 100 may be installed on the ground or at a certain height from the ground. The collision accident prevention apparatus 100 may be installed by being attached or fixed to an existing facility such as a traffic light. Referring to FIG. 1, although the collision accident prevention apparatus 100 is installed at an upper end of a facility corresponding to a vehicle traffic light, the present disclosure is not limited thereto.

Referring to FIG. 1, the collision accident prevention apparatus 100 detects a pedestrian moving in the caution zone and a vehicle traveling in the caution zone, and tracks the detected pedestrian and the detected vehicle.

The term "pedestrian" refers to a person walking on a caution zone. The term "vehicle" may refer to a driving means such as a vehicle or a two-wheeled vehicle running on a road. The vehicle may be an autonomous vehicle or a vehicle equipped with a driving assistance device. The vehicle may obtain data on a surrounding 3D space by using a sensor, or may obtain data on a surrounding 3D space from other surrounding vehicles or the collision accident prevention apparatus 100.

A method of preventing collision between a pedestrian moving in a caution zone and a vehicle traveling in the caution zone will be described.

Figure 2:
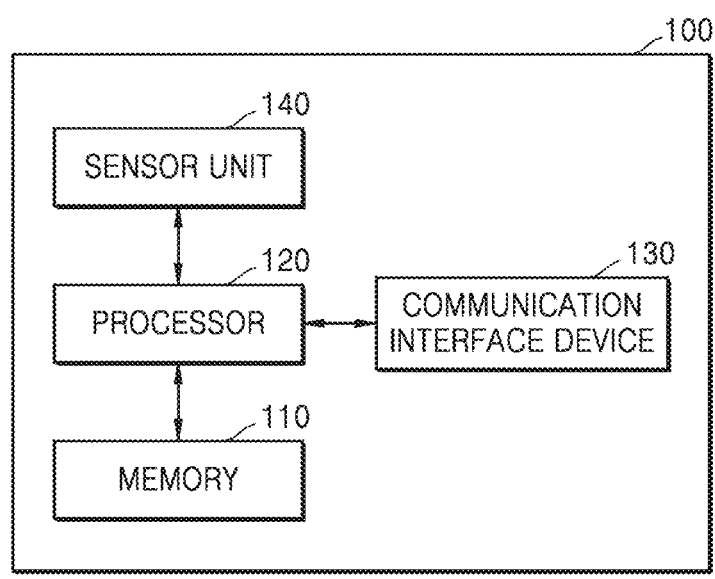
FIG. 2 is a block diagram illustrating a configuration of a collision accident prevention apparatus, according to an embodiment.

FIG. 2 is a block diagram illustrating a configuration of the collision accident prevention apparatus 100, according to an embodiment.

Referring to FIG. 2, the collision accident prevention apparatus 100 may include a memory 110, a processor 120, a communication interface device 130, and a sensor unit 140. It will be understood by one of ordinary skill in the art related to the present embodiment that the collision accident prevention apparatus 100 may further include other general-purpose elements in addition to elements illustrated in FIG. 2.

The memory 110 may store software and/or a computer program. For example, the memory 110 may store a program such as an application or an application programming interface (API) and various types of data. The memory 110 may store instructions executable by the processor 120.

The processor 120 may access and use data stored in the memory 110, or may store new data in the memory 110. The processor 120 may execute the instructions stored in the memory 110. The processor 120 may execute a computer program installed in the collision accident prevention apparatus 100.

The processor 120 may include at least one processing module. For example, the processor 120 may include a processing module that executes a program for determining a degree of risk of collision by tracking a moving object such as a pedestrian or a vehicle in a 3D space, as a dedicated processing module. The processor 120 may control other elements included in the collision accident prevention apparatus 100 to perform an operation corresponding to an execution result of the instructions or the compute program.

The communication interface device 130 may perform wired/wireless communication with another device or a network. To this end, the communication interface device 130 may include a communication module that supports at least one of various wired/wireless communication methods. For example, the communication interface device 130 may include a communication module that performs short-range communication such as wireless fidelity (Wi-Fi), any of various types of mobile communication such as 3G, 4G, or 4G, or ultra-wideband communication, or a communication module that performs wired communication using a coaxial cable or an optical cable. The communication interface device 130 may be connected to a device located outside the collision accident prevention apparatus 100 and may transmit and receive a message including a signal or data. The collision accident prevention apparatus 100 may perform communication with a vehicle or another collision accident prevention apparatus 100 through the communication interface device 130, or may also be connected to a server that provides a collision accident prevention service for managing a zone in which the collision accident prevention apparatus 100 is located.

The sensor unit 140 may include at least one sensor for sensing a 3D space. The sensor unit 140 may detect an object located within a sensing range, and may obtain data for generating coordinates of the detected object in a 3D space. The sensor unit 140 may obtain shape data or distance data of the object located within the sensing range. The sensor unit 140 may include at least one of various types of sensors such as a light detection and ranging (Lidar) sensor, a time-of-flight (ToF) 3D sensor, a radar sensor, an infrared image sensor, and an ultrasonic sensor.

The sensor unit 140 may use a plurality of sensors, to obtain spatial data for a 3D space. In this case, the sensor unit 140 may use the same types of sensors or may use a combination of different types of sensors, in consideration of a sensing range of each type of sensor or the type of data that may be obtained. For example, the sensor unit 140 may include at least one 3D Lidar sensor and may obtain data on a space in a range of 360°. The sensor unit 140 may further include another type of sensor to obtain data on a blind area that may not be detected by the 3D Lidar sensor or a space adjacent to the collision accident prevention apparatus 100 within a certain distance.

Although not shown in FIG. 2, the collision accident prevention apparatus 100 may further include an element such as a global positioning system (GPS). The GPS is a satellite-based navigation system that receives a signal from a GPS satellite and calculates a location of the collision accident prevention apparatus 100 or locations of surrounding objects.

The processor 120 may perform the following operation by executing the instructions stored in the memory 110. The processor 120 may predict, based on data on a 3D space corresponding to a caution zone detected by the sensor unit 140, motion of each of at least one pedestrian in the caution zone and at least one vehicle in the caution zone.

Because the data on the 3D space corresponding to the caution zone detected by the sensor unit 140 may have a fixed coordinate value corresponding to a fixed location of the collision accident prevention apparatus 100, the data may be mapped to a corresponding portion of a coordinate system based on a certain coordinate, for example, an absolute coordinate system based on an origin.

The processor 120 may identify at least one object in the 3D space, based on the data on the 3D space detected by the sensor unit 140. For example, the processor 120 may identify the at least one pedestrian and the at least one vehicle, based on shape information of the object obtained by clustering the data on the 3D space corresponding to the caution zone and object information obtained by using a neural network-based object classification model for the data on the 3D space. The processor 120 may identify even a type of the moving object, based on the neural network-based object classification model.

The processor 120 may track the object in the 3D space and analyze each motion pattern, based on at least one attribute information of a type, 3D shape, location, posture, size, trajectory, and speed of the object identified in the 3D space detected by the sensor unit 140. The processor 120 may predict motion of the at least one object, based on the analyzed motion pattern. For example, the processor 120 may identify and track each of the at least one pedestrian and the at least one vehicle, and analyze each motion pattern, based on the data on the 3D space corresponding to the caution zone, and may predict motion of each of the at least one pedestrian and the at least one vehicle based on a result.

The processor 120 may determine a degree of risk of collision between the at least one pedestrian and the at least one vehicle, based on the predicted motion of each of the at least one pedestrian and the at least one vehicle. For example, the processor 120 may determine a degree of risk of collision between the at least one pedestrian and the at least one vehicle, based on an overlapping probability between a bounding box surrounding an area indicating the at least one pedestrian and a bounding box surrounding an area indicating the at least one vehicle.

The processor 120 may provide a message corresponding to the determined degree of risk of collision to the at least one vehicle through the communication interface device 130. In this case, the message may include data or information corresponding to the degree of risk of collision, or metadata or pre-defined data used by a receiver of the message to find appropriate data or information. The message may include a command or operation itself used to control an operation of the receiver of the message, or information about the command or operation.

For example, when it is determined that there are a plurality of different degrees of risk of collision, the processor 120 may generate different messages corresponding to the different degrees of risk of collision, and may transmit the different messages to the at least one vehicle through the communication interface device 130. For example, when there are a plurality of pedestrians and a vehicle in the caution zone, when there are a pedestrian and a plurality of vehicles, or when there are a plurality of pedestrians and a plurality of vehicles, the collision accident prevention apparatus 100 may determine a plurality of degrees of risk of collision, and may transmit messages corresponding to the results to the at least one vehicle.

In another example, the processor 120 may provide different messages to a collidable vehicle whose degree of risk of collision with the at least one pedestrian is equal to or higher than a certain threshold and a vehicle subsequent to the collidable vehicle, based on the determined degree of risk of collision. When there is the collidable vehicle whose degree of risk of collision is equal to or higher than the certain threshold, the collision accident prevention apparatus 100 may provide different messages to the collidable vehicle and the subsequent vehicle.

In another example, when there is a degree of risk of collision equal to or higher than a certain threshold from among the determined degrees of risk of collision, the processor 120 may provide a message corresponding to a collision situation to a collidable vehicle whose degree of risk of collision is equal to or higher than the certain threshold. When a collision situation is certain, the collision accident prevention apparatus 100 may provide a message corresponding to the collision situation to a collision-expected vehicle.

The processor 120 may transmit the message corresponding to the degree of risk of collision through the communication interface apparatus 130 to at least one of a vehicle or another device within a certain distance from the collision accident prevention apparatus 100 or a server that provides a collision accident prevention service. The collision accident prevention apparatus 100 may transmit the message corresponding to the degree of risk of collision to a surrounding device that may communicate with the collision accident prevention apparatus 100 as well as to the vehicle in the caution zone, to control an operation of the surrounding device or cause the surrounding device to operate based on the received message.

Specific examples will be described in detail with reference to FIGS. 3 through 8.

Figure 3:
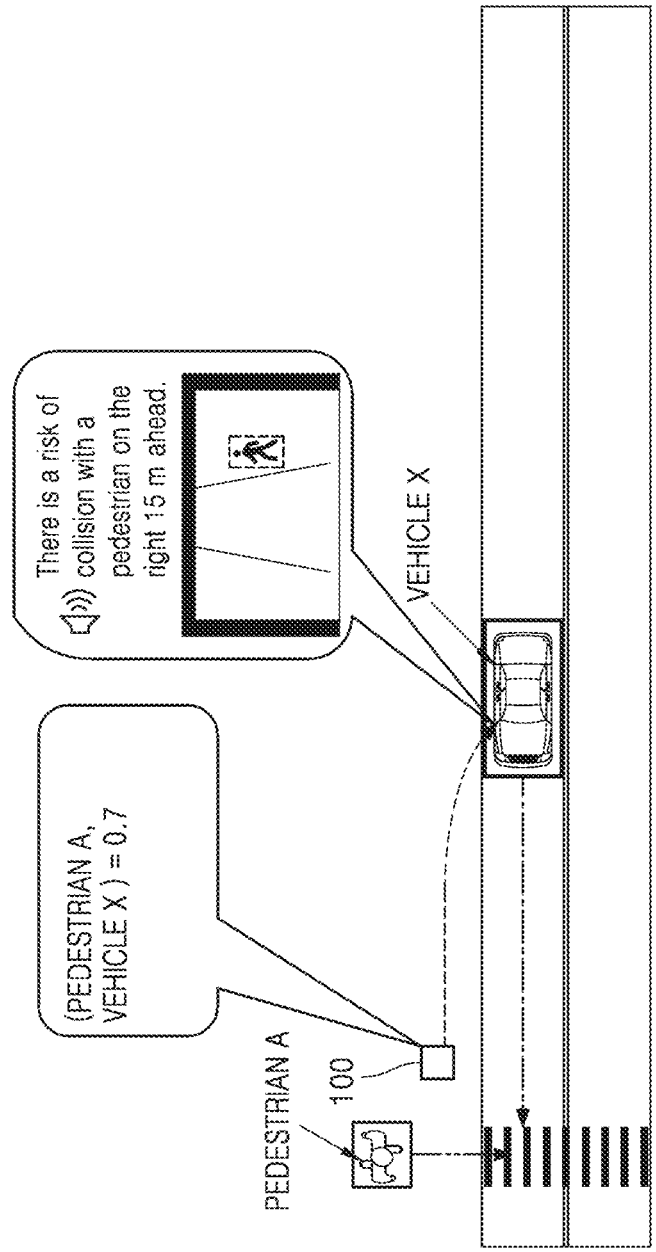
FIG. 3 is a view for describing an operation of a collision accident prevention apparatus, when there are a pedestrian and a vehicle in a caution zone.

FIG. 3 is a view for describing an operation of the collision accident prevention apparatus 100, when there are a pedestrian and a vehicle in a caution zone.

Referring to FIG. 3, the collision accident prevention apparatus 100 may predict motion of each of a pedestrian 'A' in a caution zone and a vehicle 'X' in the caution zone, based on data on a 3D space corresponding to the caution zone. The collision accident prevention apparatus 100 may track the pedestrian 'A' and the vehicle 'X' in the caution zone, and analyze each motion pattern, based on at least one attribute information of a shape, location, size, trajectory, and speed of each of the pedestrian 'A' and the vehicle 'X', and may predict each motion.

The collision accident prevention apparatus 100 may determine a degree of risk of collision between the pedestrian 'A' and the vehicle 'X', based on the predicted motion of each of the pedestrian 'A' and the vehicle 'X', and may provide a message corresponding to the determined degree of risk of collision to the vehicle 'X'. When a degree of risk of collision between the pedestrian 'A' and the vehicle 'X' is '0.7' as shown in FIG. 3, the collision accident prevention apparatus 100 may provide a message corresponding to the degree of risk of collision of '0.7' to the vehicle 'X'.

The message may include data or information corresponding to the degree of risk of collision, or may include metadata or pre-defined data which may be used by a vehicle receiving the message. For example, the message may include a voice guidance and/or an image processing operation suitable for the degree of risk of collision of '0.7' and information indicating a distance between the pedestrian and the vehicle or an expected collision time. Alternatively, the message may include data such as the degree of risk of collision of '0.7' and location information of the pedestrian 'A' and the vehicle 'X' which may be used by the vehicle receiving the message.

As shown in FIG. 3, the collision accident prevention apparatus 100 may transmit, as the message corresponding to the degree of risk of collision of '0.7', a location of the pedestrian 'A' from the vehicle 'X' and a voice guidance and/or an image processing operation indicating that there is a risk of collision to the vehicle 'X'. In this case, the image processing operation may be an operation of surrounding the pedestrian 'A' displayed on a display device of the vehicle 'X' with a boundary line of a specific color.

Figure 4:
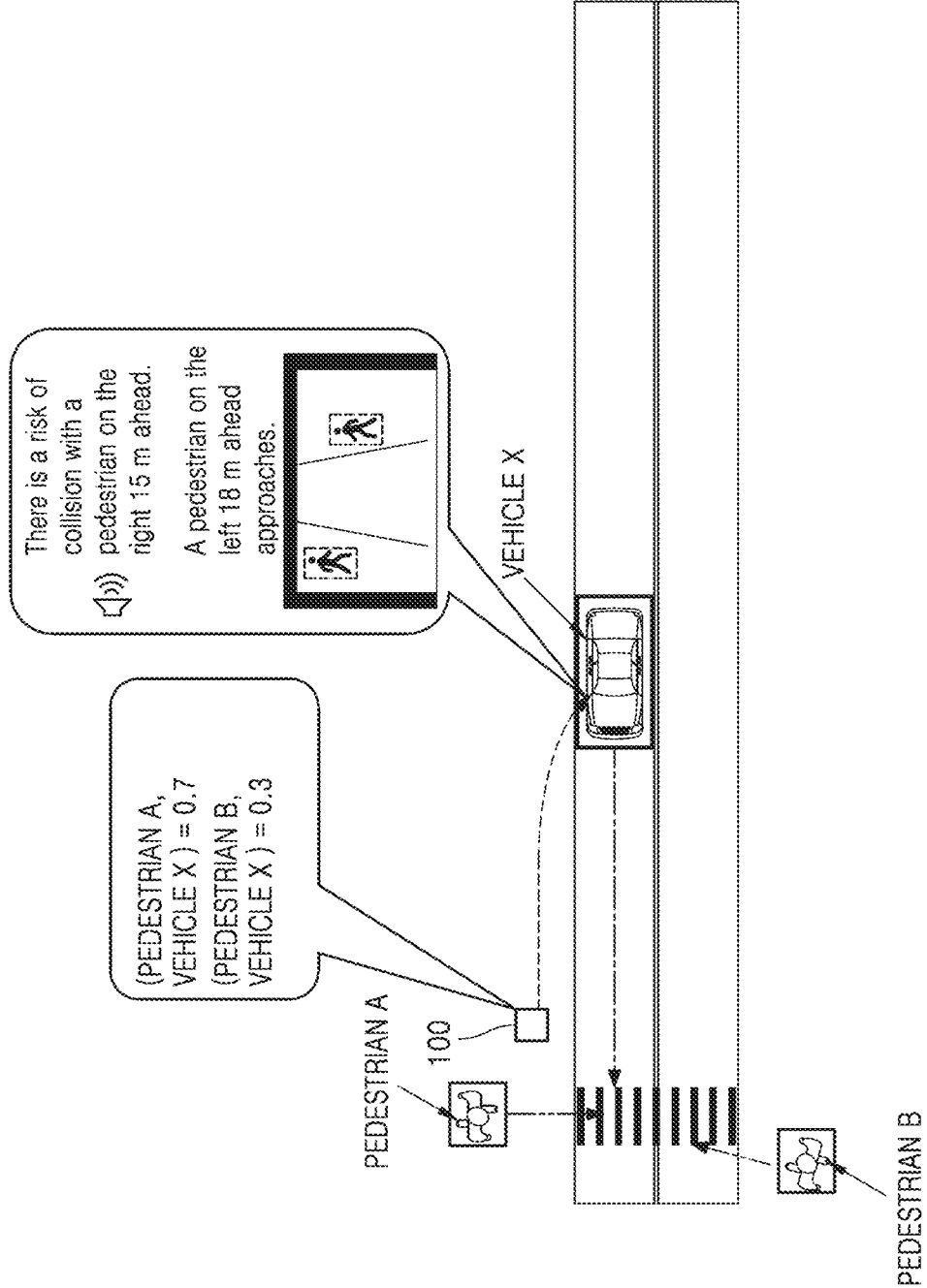
FIG. 4 is a view for describing an operation of a collision accident prevention apparatus, when there are a plurality of pedestrians and a vehicle in a caution zone.

FIG. 4 is a view for describing an operation of the collision accident prevention apparatus 100, when there are a plurality of pedestrians and a vehicle in a caution zone.

Referring to FIG. 4, the collision accident prevention apparatus 100 may predict, based on data on a 3D space corresponding to a caution zone, motion of each of a pedestrian 'A' and a pedestrian 'B' in the caution zone and the vehicle 'X' in the caution zone. The collision accident prevention apparatus 100 may determine a degree of risk of collision between the pedestrian 'A' and the vehicle 'X' and a degree of risk of collision between the pedestrian 'B' and the vehicle 'X', based on the predicted motions of the pedestrian 'A', the pedestrian 'B', and the vehicle 'X', and when different degrees of risk of collision are determined, may generate different messages corresponding to the different degrees of risk of collision and may provide the different messages to the vehicle 'X'.

When the collision accident prevention apparatus 100 determines that a degree of risk of collision between the pedestrian a and the vehicle 'X' is '0.7' and a degree of risk of collision between the pedestrian 'B' and the vehicle 'X' is '0.3', the collision accident prevention apparatus 100 may provide different messages corresponding to the degree of risk of collision of '0.7' and the degree of risk of collision of '0.3' to the vehicle 'X'. The collision accident prevention apparatus 100 may transmit, as a message corresponding to the degree of risk of collision of '0.7', a location of the pedestrian 'A' from the vehicle 'X' and a voice guidance and/or an image processing operation indicating that there is a risk of collision to the vehicle 'X'. The collision accident prevention apparatus 100 may transmit, as a message corresponding to the degree of risk of collision of '0.3', and a location of the pedestrian 'B' from the vehicle 'X' and a voice guidance and/or an image processing operation indicating that the pedestrian 'B' approaches to the vehicle 'X'.

Figure 5:
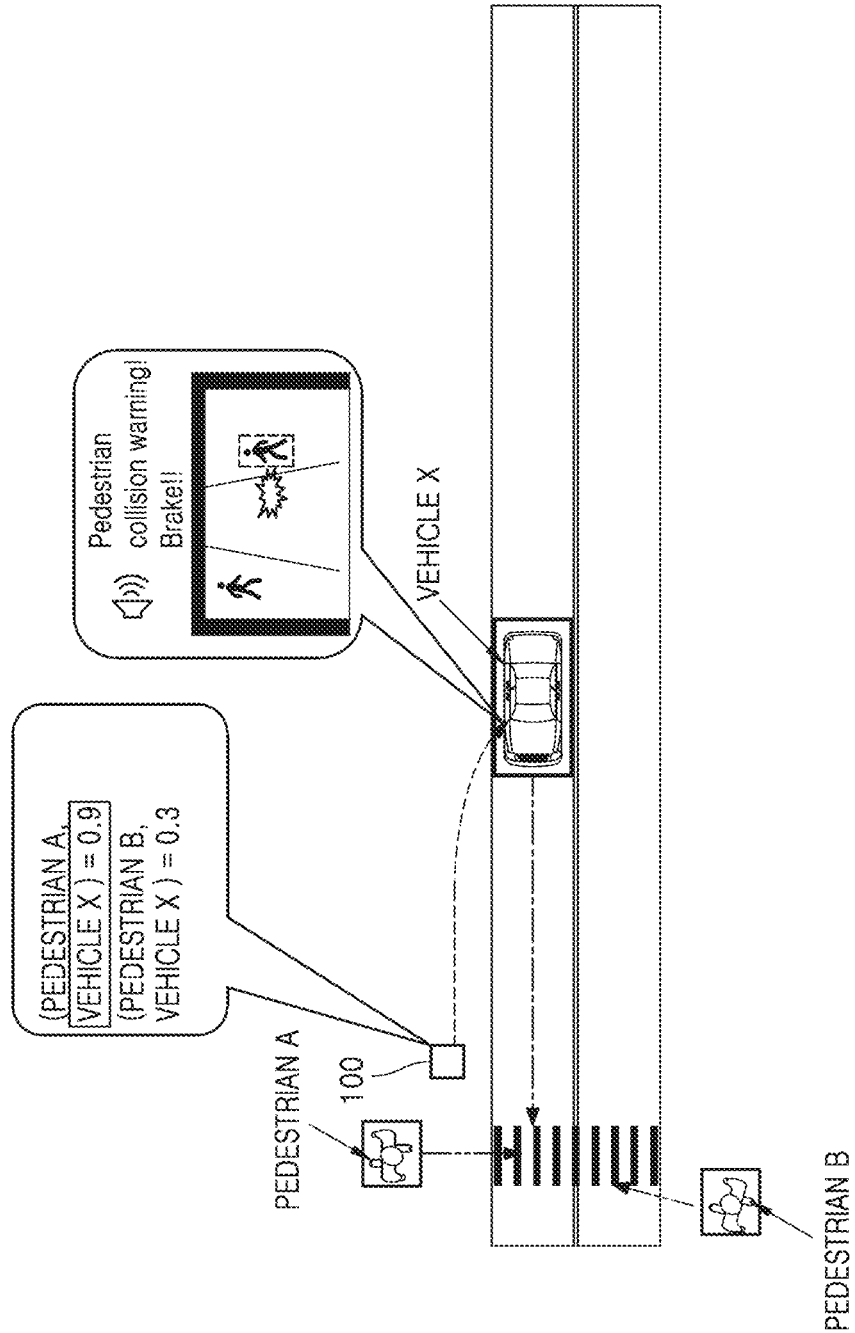
FIG. 5 is a view for describing an operation of a collision accident prevention apparatus, when there are a plurality of pedestrians and a vehicle in a caution zone and it is determined that a degree of risk of collision is equal to or higher than a certain threshold.

FIG. 5 is a view for describing an operation of the collision accident prevention apparatus 100, when there are a plurality of pedestrians and a vehicle in a caution zone and it is determined that a degree of risk of collision is equal to or higher than a certain threshold.

Referring to FIG. 5, as described with reference to FIG. 4, the collision accident prevention apparatus 100 may determine, based on predicted motion of each of a pedestrian 'A' and a pedestrian 'B' in a caution zone and a vehicle 'X' in the caution zone, a degree of risk of collision between the pedestrian 'A' and the vehicle 'X' and a degree of risk of collision between the pedestrian 'B' and the vehicle 'X'. When there is a degree of risk of collision equal to or higher than a certain threshold from among the determined degrees of risk of collision, the collision accident prevention apparatus 100 may provide a message corresponding to a collision situation to a collidable vehicle whose degree of risk of collision is equal to or higher than the certain threshold.

As shown in FIG. 5, when the collision accident prevention apparatus 100 determines that a degree of risk of collision between the pedestrian 'A' and the vehicle 'X' is '0.9' and a degree of risk of collision between the pedestrian 'B' and the vehicle 'X' is '0.3', and a certain threshold for determining a collision situation is '0.8', the vehicle 'X' may be determined as a vehicle collidable with the pedestrian 'A'. In this case, the collision accident prevention apparatus 100 may provide a message corresponding to the collision situation to the vehicle 'X' that is a collidable vehicle.

The collision accident prevention apparatus 100 may transmit, as the message corresponding to the collision situation, a voice guidance indicating a pedestrian collision warning and deceleration instruction and/or an image processing operation of creating a collision situation with the pedestrian 'A' displayed on a display device of the vehicle 'X' to the vehicle 'X'.

Figure 6:
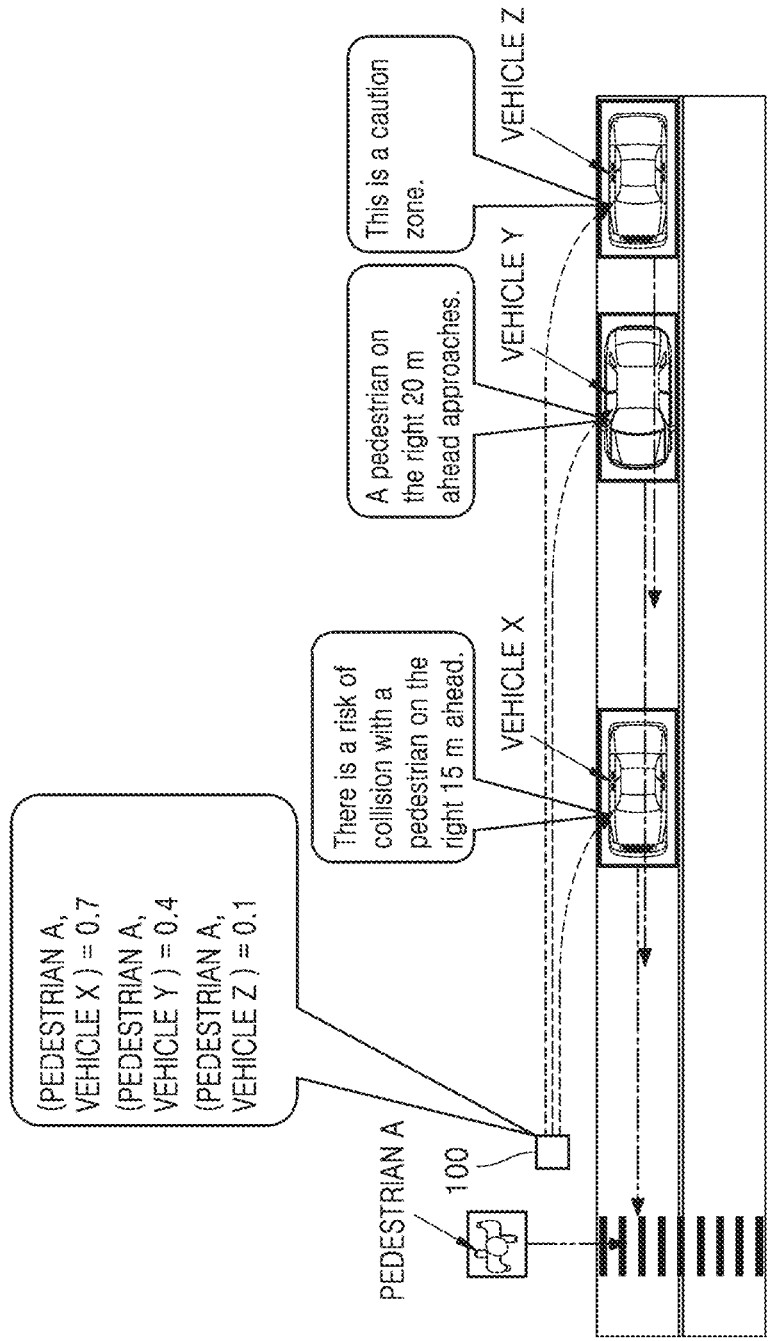
FIG. 6 is a view for describing an operation of a collision accident prevention apparatus, when there are a pedestrian and a plurality of vehicles in a caution zone.

FIG. 6 is a view for describing an operation of the collision accident prevention apparatus 100, when there are a pedestrian and a plurality of vehicles in a caution zone.

Referring to FIG. 6, the collision accident prevention apparatus 100 may predict, based on data on a 3D space corresponding to a caution zone, motion of each of a pedestrian 'A' in the caution zone, and a vehicle 'X', a vehicle 'Y', and a vehicle 'Z' in the caution zone. The collision accident prevention apparatus 100 may determine a degree of risk of collision between the pedestrian 'A' and the vehicle 'X', the pedestrian 'A' and the vehicle 'Y', and the pedestrian 'A' and the vehicle 'Z', based on the predicted motions of the pedestrian 'A' and the vehicle 'X', the vehicle 'Y', and the vehicle 'Z', and may provide messages corresponding to the determined degrees of risk of collision to the vehicle 'X', the vehicle 'Y', and the vehicle 'Z'.

As shown in FIG. 6, when the collision accident prevention apparatus 100 determines that a degree of risk of collision between the pedestrian 'A' and the vehicle 'X' is '0.7', a degree of risk of collision between the pedestrian 'A' and the vehicle 'Y' is '0.4', and a degree of risk of collision between the pedestrian 'A' and the vehicle 'Z' is '0.1', the collision accident prevention apparatus 100 may provide different messages respectively corresponding to the degree of risk of collision of '0.7', the degree of risk of collision of '0.3', and the degree of risk of collision of '0.1' to the vehicle 'X', the vehicle 'Y', and the vehicle 'Z'. In this case, the collision accident prevention apparatus 100 may classify the determined different degrees of risk of collision into a plurality of groups, and may generate different messages respectively corresponding to the classified plurality of groups.

The collision accident prevention apparatus 100 may transmit a location of the pedestrian 'A' from the vehicle 'X' and a voice guidance and/or an image processing operation indicating that there is a risk of collision to the vehicle 'X'. The collision accident prevention apparatus 100 may transmit a location of the pedestrian 'A' from the vehicle 'Y' and a voice guidance and/or an image processing operation indicating that the pedestrian 'A' approaches to the vehicle 'Y'. The collision accident prevention apparatus 100 may transmit a voice guidance and/or an image processing operation indicating that the vehicle 'Z' is traveling in the caution zone to the vehicle 'Z'.

The collision accident prevention apparatus 100 may transmit generated different messages to at least one vehicle, based on a location of the at least one vehicle. The location of the at least one vehicle may be determined based on data detected by the sensor unit 140, or may be received from another server connected to a network through the communication interface device 130. The collision accident prevention apparatus 100 may respectively transmit different messages to the vehicle 'X', the vehicle 'Y', and the vehicle 'Z', based on locations of the vehicle 'X', the vehicle 'Y', and the vehicle 'Z'.

For example, the collision accident prevention apparatus 100 may broadcast a message for each vehicle corresponding to location information of each vehicle or may broadcast a message indicating an entire surrounding situation, and each vehicle may use a filtered message or information by using its location information. In another example, the collision accident prevention apparatus 100 may encode and broadcast each message by using location information of each vehicle, and each vehicle may use only a message that is decoded by using its location information. In another embodiment, the collision accident prevention apparatus 100 may transmit each message by using different communication methods or radio waves of different sizes, based on a location of at least one vehicle.

The collision accident prevention apparatus 100 may transmit, by using identification information for identifying at least one vehicle as destination information of each of generated different messages, the generated different messages to the at least one vehicle. The collision accident prevention apparatus 100 may transmit, by using identification information for identifying each of the vehicle 'X', the vehicle 'Y', and the vehicle 'Z' as destination information of each of different messages, the different messages to the vehicle 'X', the vehicle 'Y', and the vehicle 'Z' respectively. For example, when each of the vehicle 'X', the vehicle 'Y', and the vehicle 'Z' has a unique communication number, the collision accident prevention apparatus 100 may transmit, by using the unique communication number of each vehicle as destination information of each of different messages, the different messages to the vehicle 'X', the vehicle 'Y', and the vehicle 'Z' respectively. The unique communication number of each vehicle may be broadcast from each vehicle into a certain space around each vehicle, and may be periodically replaced.

Figure 7:
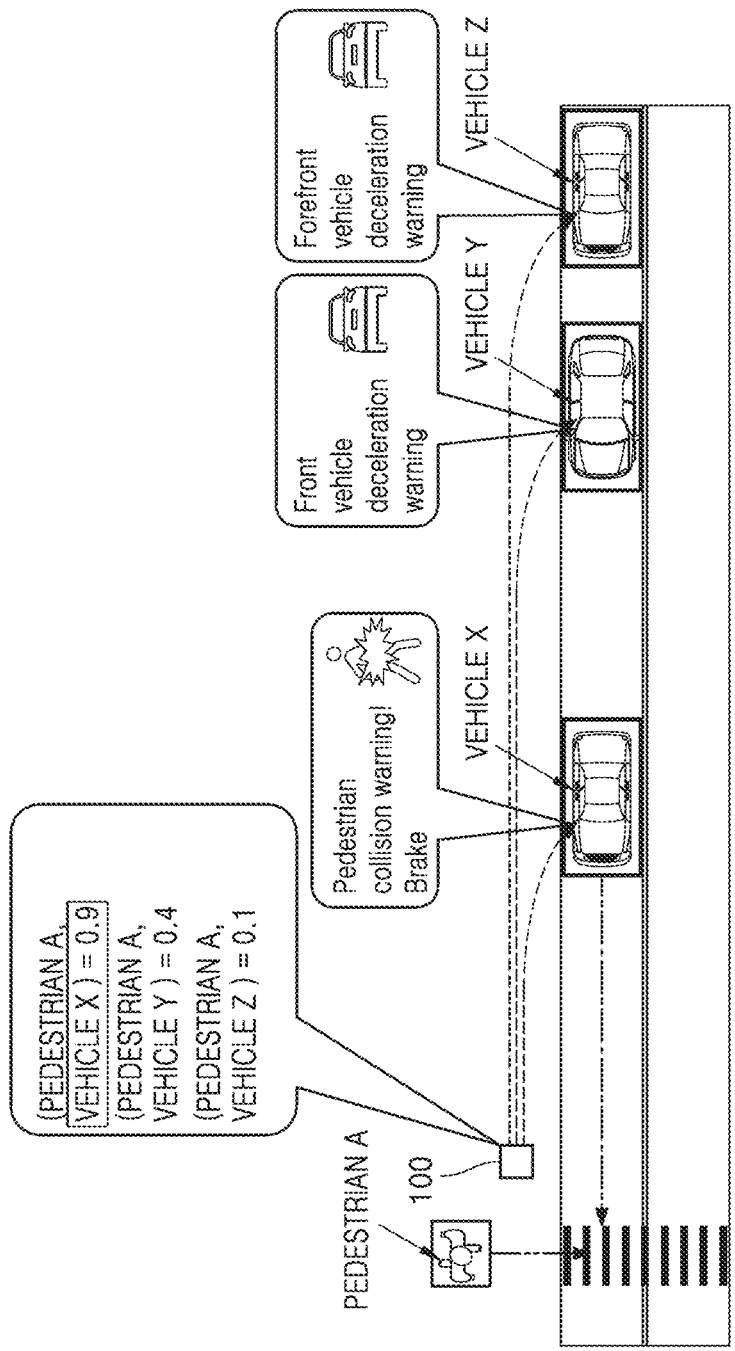
FIG. 7 is a view for describing an operation of a collision accident prevention apparatus, when there are a pedestrian and a plurality of vehicles in a caution zone and it is determined that a degree of risk of collision is equal to or higher than a certain threshold.

FIG. 7 is a view for describing an operation of the collision accident prevention apparatus 100, when there are a pedestrian and a plurality of vehicles in a caution zone and it is determined that there is a degree of risk of collision equal to or higher than a certain threshold.

Referring to FIG. 7, the collision accident prevention apparatus 100 may determine, based on predicted motion of each of a pedestrian 'A' in a caution zone and a vehicle 'X', a vehicle 'Y', and a vehicle 'Z' in the caution zone, a degree of risk of collision between the pedestrian 'A' and the vehicle 'X', a degree of risk of collision between the pedestrian 'A' and the vehicle 'Y', and a degree of risk of collision between the pedestrian 'A' and the vehicle 'Z'. When it is determined that there are a plurality of different degrees of risk of collision, the collision accident prevention apparatus 100 may generate different messages corresponding to the different degrees of risk of collision. In this case, the collision accident prevention apparatus 100 may classify the determined different degrees of risk of collision into a plurality of groups, and may generate different messages respectively corresponding to the classified plurality of groups. The collision accident prevention apparatus 100 may provide the generated different messages to the vehicle 'X', the vehicle 'Y', and the vehicle 'Z'.

For example, the collision accident prevention apparatus 100 may classify the determined different degrees of risk of collision into a collision-expected group having a degree of risk of collision of '0.8' or more, a collidable group having a degree of risk of collision of '0.5' to '0.8', a collision monitoring group having a degree of risk of collision of '0.2' to '0.5', and a non-collision group having a degree of risk of collision of less than '0.2'.

When there is a degree of risk of collision equal to or higher than a certain threshold from among the determined degrees of risk of collision, that is, when there is a vehicle corresponding to the collision-expected group having a degree of risk of collision of '0.8' or more, the collision accident prevention apparatus 100 may provide a message corresponding to a collision situation to the vehicle 'X' that is collision-expected. The collision accident prevention apparatus 100 may provide different messages to the vehicle 'X' whose degree of risk of collision with the pedestrian 'A' is equal to or higher than the certain threshold and to the vehicle 'Y' and the vehicle 'Z' that are subsequent to the vehicle 'X'. For example, the collision accident prevention apparatus 100 may provide a collision warning and deceleration instruction message to the vehicle 'X' that is a collidable vehicle whose degree of risk of collision is equal to or higher than the certain threshold, and may provide a deceleration notice message for notifying beforehand deceleration of a forward vehicle or a forefront vehicle to the vehicle 'Y' and the vehicle 'Z' that are subsequent vehicles. Furthermore, the collision accident prevention apparatus 100 may transmit a message including a command or operation for automatic deceleration control to a vehicle corresponding to the collision-expected group, and may transmit a message including a command or operation for switching a driving mode to an autonomous driving mode or a manual driving mode to a vehicle corresponding to the collidable group or the collision monitoring group. The vehicle may be preset to perform a series of processing steps, when receiving the message including the command or operation or information about the command or operation.

Figure 8:
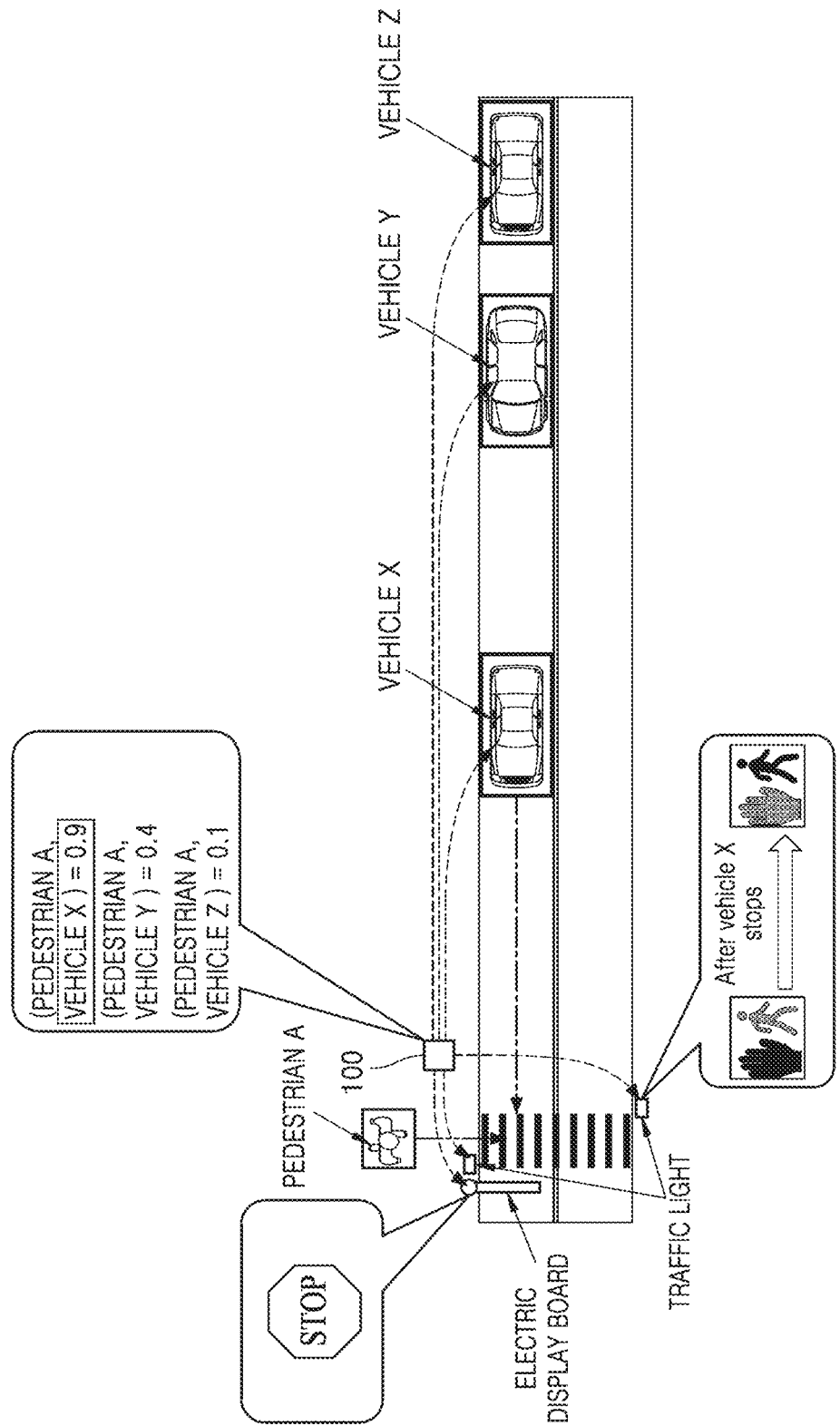
FIG. 8 is a view for describing an operation of a collision accident prevention apparatus, when there is a display device or a traffic light installed in a caution zone.

FIG. 8 is a view for describing an operation of the collision accident prevention apparatus 100, when there is a display device or a traffic light installed in a caution zone.

Referring to FIG. 8, the collision accident prevention apparatus 100 may determine, based on predicted motion of each of a pedestrian 'A' in a caution zone, and a vehicle 'X', a vehicle 'Y', and a vehicle 'Z' in the caution zone, a degree of risk of collision between the pedestrian 'A' and the vehicle 'X', a degree of risk of collision between the pedestrian 'A' and the vehicle 'Y', and a degree of risk of collision between the pedestrian 'A' and the vehicle 'Z'.

The collision accident prevention apparatus 100 may transmit a message corresponding to a highest degree of risk of collision from among the determined degrees of risk of collision to a display device such as an electric display board or a traffic light installed in the caution zone. Referring to FIG. 8, the collision accident prevention apparatus 100 may transmit a message corresponding to '0.9' that is a highest degree of risk of collision to a display device such as an electric display board, a vehicle traffic light, or a pedestrian traffic light. The display device, the vehicle traffic light, or the pedestrian traffic light receiving the message from the collision accident prevention apparatus 100 may operate based on the received message.

For example, the display device such as the electric display board may receive the message corresponding to the degree of risk of collision of '0.9', and then may display an image of 'STOP' on a display panel. The pedestrian traffic light may receive the message corresponding to the degree of risk of collision of '0.9', and then, when the vehicle 'X' stops and the degree of risk of collision decreases below the certain threshold, the pedestrian traffic light may switch a pedestrian signal to allow a pedestrian to cross a crosswalk. When the motion of a person running to cross the crosswalk stops or completely crosses the crosswalk and the degree of risk of collision decreases below the certain threshold, the vehicle traffic light may switch a vehicle signal to allow a vehicle to move.

Figure 9:
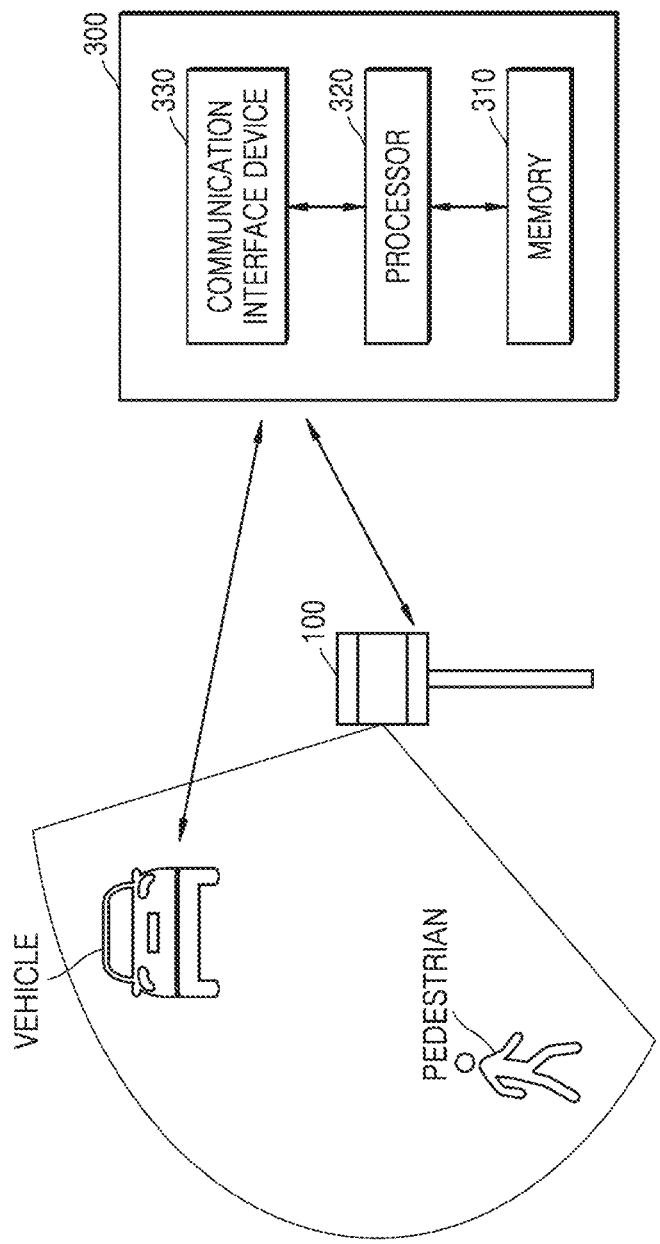
FIG. 9 is a block diagram illustrating a configuration of a collision accident prevention server, according to another embodiment.

FIG. 9 is a block diagram illustrating a configuration of a collision accident prevention server 300, according to another embodiment.

As described above, the collision accident prevention apparatus 100 may be an embedded device including a processor that is configured to determine a degree of risk of collision between a pedestrian and a vehicle in a caution zone and provide a message corresponding to a result to the vehicle, but the present disclosure is not limited thereto. As shown in FIG. 9, the collision accident prevention apparatus 100 may obtain data on a 3D space corresponding to a caution zone, and then may transmit the obtained data to the collision accident prevention server 300 that provides a collision accident prevention service, so that the collision accident prevention server 300 determines a degree of risk of collision and performs a series of subsequent processing steps. Because the data on the 3D space obtained by the collision accident prevention apparatus 100 is anonymized, even when the data is transmitted to and processed by the collision accident prevention server 300, privacy infringement does not occur.

The collision accident prevention server 300 may be implemented by using technology such as cloud computing. The collision accident prevention server 300 may determine a degree of risk of collision between a pedestrian and a vehicle in a caution zone by performing high-speed data communication with the collision accident prevention apparatus 100, and may provide a message corresponding to a result to the vehicle.

Referring to FIG. 9, the collision accident prevention server 300 may include a memory 310, a processor 320, and a communication interface device 330. It will be understood by one of ordinary skill in the art related to the present embodiment that the collision accident prevention server 300 may further include other general-purpose elements in addition to elements illustrated in FIG. 9. The description of the collision accident prevention apparatus 100 may be applied to the same configuration of the collision accident prevention server 300 even when the description is omitted.

The memory 310 may store software and/or a program. The memory 310 may store instructions executable by the processor 320.

The processor 320 may use data stored in the memory 3140, or may store new data in the memory 310. The processor 320 may execute the instructions stored in the memory 310. The processor 320 may execute a computer program installed in the collision accident prevention server 300. The processor 320 may include at least one processing module. The processor 320 may control other elements included in the collision accident prevention server 300 to perform an operation corresponding to an execution result of the instructions or the computer program.

The communication interface device 330 may perform wired/wireless communication with another device or a network. The communication interface device 330 may be connected to a device located outside the collision accident prevention server 300 and may transmit and receive a signal or data. The collision accident prevention server 300 may perform communication with the collision accident prevention apparatus 100 or a vehicle through the communication interface device 330, or may also be connected to another server connected to the network. For example, the collision accident prevention server 300 may obtain data on a 3D space corresponding to a caution zone from the collision accident prevention apparatus 100 through the communication interface device 330. The collision accident prevention server 300 may obtain a degree of risk of collision between a pedestrian and a vehicle determined by the collision accident prevention apparatus 100 from the collision accident prevention apparatus 100 through the communication interface device 330. The collision accident prevention apparatus 100 may transmit a determination result to the collision accident prevention server 300, only when the determined degree of risk of collision between the pedestrian and the vehicle is equal to or higher than a certain threshold. The collision accident prevention server 300 may directly communicate with the vehicle, or may obtain information about the vehicle such as a location, speed, or trajectory of the vehicle from another server connected to the network.

The processor 3520 may execute the instructions to predict, based on the data on the 3D space corresponding to the caution zone obtained through the communication interface device 330, motion of each of at least one pedestrian in the caution zone and at least one vehicle in the caution zone. The processor 320 may further using information about the vehicle obtained by directly communicating with the vehicle or obtained from another server connected to the network, along with the data on the 3D space corresponding to the caution zone obtained by the collision accident prevention apparatus 100, to predict motion of each of the at least one pedestrian in the caution zone and the at least one vehicle in the caution zone.

The processor 320 may execute the instructions to determine, based on the predicted motion, a degree of risk of collision between the at least one pedestrian and the at least one vehicle.

The processor 320 may execute the instructions to provide a message corresponding to the determined degree of risk of collision to the at least one vehicle through the communication interface device 330. Also, the processor 3210 may transmit a message corresponding to a highest degree of risk of collision from among the determined degrees of risk of collision to a display device or a traffic light installed in the caution zone.

Figure 10:
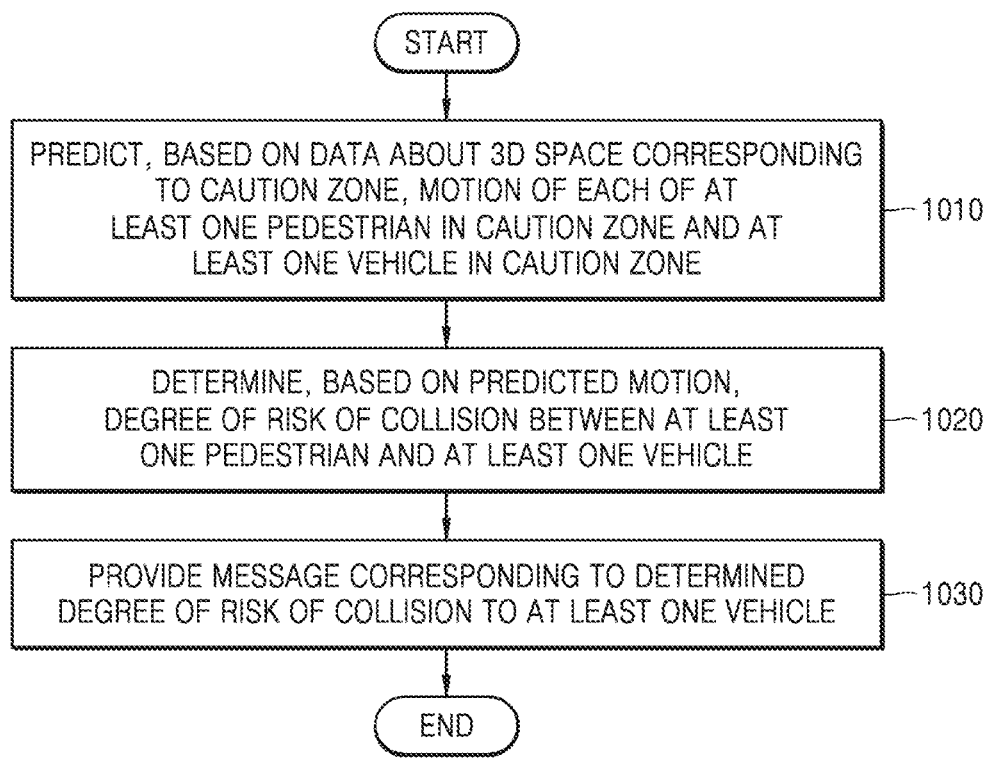
FIG. 10 is a flowchart illustrating a collision accident prevention method, according to another embodiment.

FIG. 10 is a flowchart illustrating a collision accident prevention method, according to another embodiment. The same description as that made for the collision accident prevention apparatus 100 or the collision accident prevention server 300 will be omitted.

In operation 1010, a computing device may predict motion of each of at least one pedestrian in a caution zone and at least one vehicle in the caution zone, based on data on a 3D space corresponding to the caution zone.

The computing device may identify each of the at least one pedestrian and the at least one vehicle, based on the data on the 3D space corresponding to the caution zone. For example, the computing device may identify each of the at least one pedestrian and the at least one vehicle, based on shape information of an object obtained by clustering the data on the 3D space corresponding to the caution zone and object information obtained by using a neural network-based object classification model for the data on the 3D space.

The computing device may analyze each motion pattern, by tracking each of the identified at least one pedestrian and at least one vehicle. The computing device may predict motion of each of the at least one pedestrian and the at least one vehicle, based on the analyzed motion pattern.

In operation 1020, the computing device may determine a degree of risk of collision between the at least one pedestrian and the at least one vehicle, based on the predicted motion.

The computing device may determine a degree of risk of collision between the at least one pedestrian and the at least one vehicle, based on an overlapping probability between a bounding box surrounding an area indicating the at least one pedestrian and a bounding box surrounding an area indicating the at least one vehicle.

In operation 1030, the computing device may provide a message corresponding to the determined degree of risk of collision to the at least one vehicle.

Also, the computing device may transmit a message corresponding to a highest degree of risk of collision from among the determined degrees of risk of collision to a display device or a traffic light installed in the caution zone.

In the computing device, each of the embodiments may be provided in the form of a computer program or an application stored in a medium, to execute certain steps for preventing a collision accident. In other words, each of the above embodiments may be provided in the form of a computer program or an application stored in a medium, so that at least one processor of the computing device performs certain steps for preventing a collision accident.

The above embodiments may be implemented in the form of a computer-readable storage medium storing instructions and data executable by a computer or a processor. At least one of the instructions and the data may be stored as program code, and when being executed by the processor, may generate a certain program module and may perform a certain operation. The computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing instructions or software, associated data, data files, and data structures, and providing the instructions or software, associated data, data files, and data structures to a processor or a computer so that the processor or computer may execute the instructions.

Embodiments have been described. It will be understood by one of ordinary skill in the art to which the disclosed embodiments belong that various changes in form and details may be made therein without departing from the spirit and scope of the present disclosure as defined by the appended claims. The disclosed embodiments should be considered in descriptive sense only and not for purposes of limitation. Therefore, the scope of the present disclosure is defined not by the detailed description of the present disclosure but by the appended claims, and all differences within the scope will be construed as being included in the present disclosure.

The invention claimed is:

1. A collision accident prevention method performed by a computing device, the collision accident prevention method comprising:
   predicting, based on data on a three-dimensional (3D) space corresponding to a caution zone, motion of each of at least one pedestrian in the caution zone and at least one vehicle in the caution zone;
   determining, based on the predicted motion, a degree of risk of collision between the at least one pedestrian and the at least one vehicle; and
   providing a message corresponding to the determined degree of risk of collision to the at least one vehicle,
   wherein the predicting comprises:
      based on the data on the 3D space corresponding to the caution zone, identifying each of the at least one pedestrian and the at least one vehicle;
      analyzing each motion pattern by tracking each of the at least one pedestrian and the at least one vehicle; and
      based on the analyzed motion pattern, predicting motion of each of the at least one pedestrian and the at least one vehicle.

2. The collision accident prevention method of claim 1, wherein the providing comprises:
   determining that there are a plurality of different degrees of risk of collision;
   generating different messages corresponding to the different degrees of risk of collision; and
   transmitting the generated different messages to the at least one vehicle.

3. The collision accident prevention method of claim 2, wherein the generating comprises:
   classifying the different degrees of risk of collision into a plurality of groups; and
   generating the different messages to respectively correspond to the classified plurality of groups.

4. The collision accident prevention method of claim 2, wherein the transmitting comprises, based on a location of the at least one vehicle, transmitting the generated different messages to the at least one vehicle.

5. The collision accident prevention method of claim 2, wherein the transmitting comprises, by using identification information for identifying the at least one vehicle as destination information of each of the generated different messages, transmitting the generated different messages to the at least one vehicle.

6. The collision accident prevention method of claim 1, wherein the providing comprises, based on the determined degree of risk of collision, providing different messages to a collidable vehicle whose degree of risk of collision with the at least one pedestrian is equal to or higher than a certain threshold and a vehicle subsequent to the collidable vehicle.

7. The collision accident prevention method of claim 6, wherein the providing comprises providing a collision warning and deceleration instruction message to the collidable vehicle, and providing a deceleration notice message for notifying beforehand deceleration of a forward vehicle to the subsequent vehicle.

8. The collision accident prevention method of claim 1, wherein the providing comprises:
   determining that there is a degree of risk of collision equal to or higher than a certain threshold from among the determined degrees of risk of collision; and
   providing a message corresponding to a collision situation to a collidable vehicle whose degree of risk of collision is equal to or higher than the certain threshold.

9. The collision accident prevention method of claim 1, further comprising transmitting a message corresponding to a highest degree of risk of collision from among the determined degrees of risk of collision to a display device or a traffic light installed in the caution zone.

10. A collision accident prevention apparatus comprising:
   a sensor unit configured to detect a three-dimensional (3D) space corresponding to a caution zone;
   a communication interface device;
   a memory storing instructions; and
   a processor configured to execute the instructions to:
      predict, based on data on the 3D space detected by the sensor unit, motion of each of at least one pedestrian in the caution zone and at least one vehicle in the caution zone,
      determine, based on the predicted motion, a degree of risk of collision between the at least one pedestrian and the at least one vehicle,
      provide a message corresponding to the determined degree of risk of collision to the at least one vehicle through the communication interface device,
      based on the data on the 3D space corresponding to the caution zone, identify each of the at least one pedestrian and the at least one vehicle,
      analyze each motion pattern by tracking each of the at least one pedestrian and the at least one vehicle, and
      based on the analyzed motion pattern, predict motion of each of the at least one pedestrian and the at least one vehicle.

11. The collision accident prevention apparatus of claim 10, wherein the processor is further configured to:
   determine that there are a plurality of different degrees of risk of collision,
   generate different messages corresponding to the different degrees of risk of collision, and
   transmit the generated different messages to the at least one vehicle through the communication interface device.

12. The collision accident prevention apparatus of claim 10, wherein the processor is further configured to, based on the determined degree of risk of collision, provide different messages to a collidable vehicle whose degree of risk of collision with the at least one pedestrian is equal to or higher than a certain threshold and a vehicle subsequent to the collidable vehicle.

13. The collision accident prevention apparatus of claim 10, wherein the processor is further configured to:
   determine that there is a degree of risk of collision equal to or higher than a certain threshold from among the determined degrees of risk of collision, and
   provide a message corresponding to a collision situation to a collidable vehicle whose degree of risk of collision is equal to or higher than the certain threshold.

14. A collision accident prevention server comprising:
   a communication interface device;
   a memory storing instructions; and
   a processor configured to execute the instructions to:
      predict, based on data on a three-dimensional (3D) space corresponding to a caution zone obtained through the communication interface device, motion of each of at least one pedestrian in the caution zone and at least one vehicle in the caution zone,
      determine, based on the predicted motion, a degree of risk of collision between the at least one pedestrian and the at least one vehicle,
      provide a message corresponding to the determined degree of risk of collision to the at least one vehicle through the communication interface device,
      based on the data on the 3D space corresponding to the caution zone, identify each of the at least one pedestrian and the at least one vehicle,
      analyze each motion pattern by tracking each of the at least one pedestrian and the at least one vehicle, and
      based on the analyzed motion pattern, predict motion of each of the at least one pedestrian and the at least one vehicle.

15. A non-transitory computer readable recording medium storing instructions which, when executed by one or more processors, cause the one or more processors to perform the method of claim 1.

* * * * *